Dec. 27, 1966  C. A. ADAMS  3,294,080

HUMIDIFIERS

Filed Aug. 31, 1964

Charles A. Adams INVENTOR.

BY Bush & Bush.

Attorneys.

United States Patent Office 3,294,080
Patented Dec. 27, 1966

3,294,080
HUMIDIFIERS
Charles A. Adams, 614 Taylor St.,
Davenport, Iowa 52802
Filed Aug. 31, 1964, Ser. No. 393,135
10 Claims. (Cl. 126—113)

This invention relates to humidifiers for hot air heating furnaces embodying mechanical means to automatically regulate and maintain a desired height of water in the evaporating basin or pan of the furnace, and to automatically shut off the inflow of water when the desired height is reached.

I accomplish these objects by the means shown in the accompanying drawings, in which.

Figure 1:
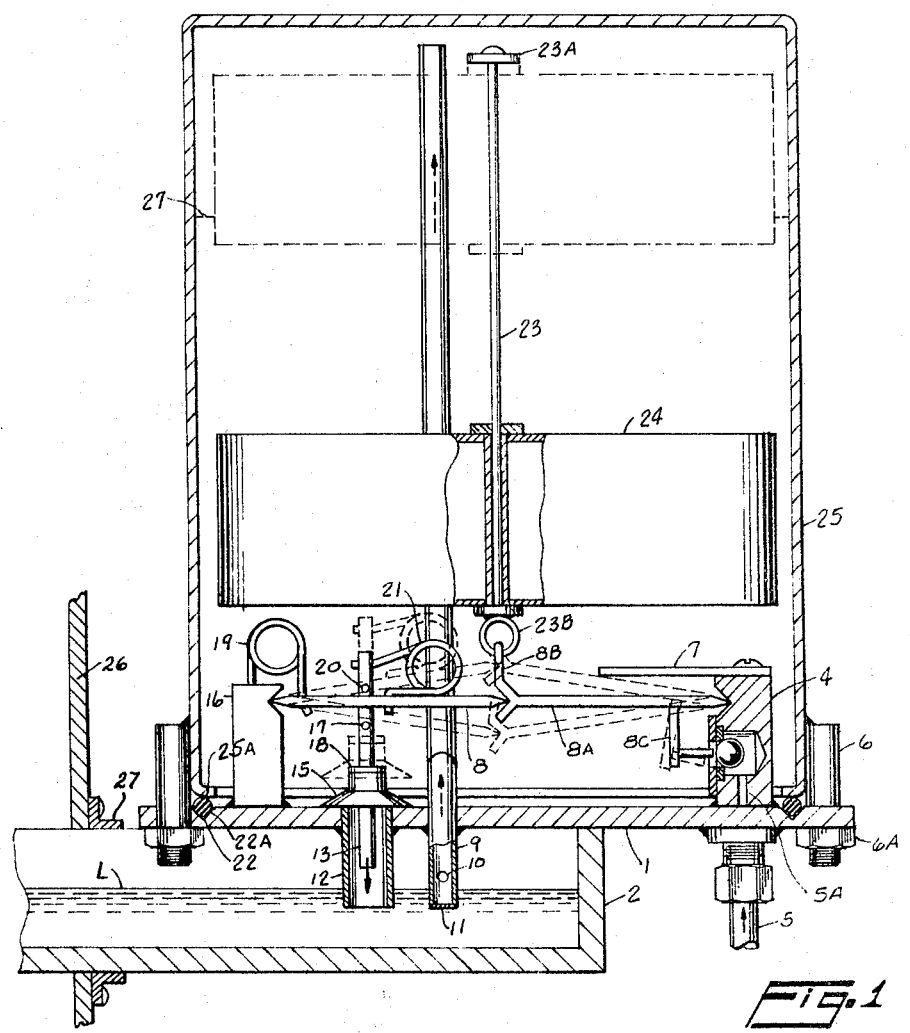
FIGURE 1 shows an elevation in section of a reservoir or tank, heating basin and water connections and valves for intake and outlet of both water and air.

FIGURE 1 indicates a tank 25 and its components for receiving a supply of water by mechanical means; also means for maintaining and delivering said supply of water to a furnace humidifier pan 2 by means of a conduit 12. A base 1 is provided for tank 25 and rests on the wall of a furnace humidifier pan 2. The pan 2 extends through and is connected to a furnace wall 26. A rectangular angle iron framework 27 is fixed to the wall 26 about the opening through which pan 2 projects. A circular groove 22 has a rubber O-ring 22A placed therein to seal it. An inverted tank having integral top and side walls is provided whereby the use of a separated upper cover is eliminated and a possible air leak is avoided. Said tank has an annular integral flange 25A at its base. Bolts 6 are secured to tank 25. Nuts 6A on the bolts 6 may draw tank 25 down onto the O-ring 22A and cause a water-tight seal. A service water system conduit 5 has a water check valve 4.

An air vent pipe 9 passes through and is sealed into the bottom of base 1, and runs up the inside wall of the tank 25 to a point close to the top. The pipe 9 is sealed at its lower end 11 and has a vent hole 10 through the side to prevent suction noise. The vent hole and pipe 9 will serve to release compressed air that occurs as tank 25 is filled with water, and also is large enough to accommodate the full flow of water from valve 4 so as to safeguard against malfunction of either of the valve 4 or float 24 which may occur, thereby preventing destruction to the system. An outlet pipe 12 is sealed into the bottom of the base 1 and acts as a guide for the valve stem 13 and also to conduct water from the tank 25 to the pan 2. The valve stem 13 carries a valve 15 which may be closed by resting on the base 1 and closing the upper end of the outlet pipe 12. Valve stem 13 is clearly shown in FIG. 1 as being suspended loosely in pipe 12, and is at no time raised enough to be removed from the pipe. Therefore, pipe 12 always guides stem 13 enough to insure that valve 15 cannot return to its seat in a precarious manner.

Figure 2:
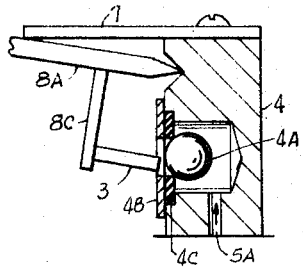
FIGURE 2 shows the water intake valve in closed position.
Figure 3:
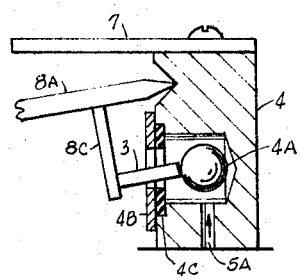
FIGURE 3 shows the water intake valve in open position.

Lever means in the form of levers or links 8 and 8A form a toggle linkage with their adjoining ends being pivotally interconnected and their opposite ends pivotally carried in notches in blocks 4 and 16. 8C is a lever on 8A having a pressure pin 3 in it. When 8A is up, as indicated in FIGURE 2, the valve 4 is closed. When 8A is down, as shown in FIG. 3, the pressure pin moves the ball 4A from the rubber seat 4C, which opens the valve 4. Lever or link 8 of the toggle linkage has a fulcrum at either end. One end is seated in end of 8A and the other end is seated in the block 16. The spring 19 furnishes end thrust to the toggle bar, one end of the spring being seated in a hole at the end of 8 and the other end in the hole in the block 16. The spring 19 will operate to bias or snap the toggle linkage as it passes through the neutral or horizontal position, shown in full in FIG. 1, to its upper and lower positions, as shown in dotted representation in FIG. 1. The lever or link 8 also has a clearance hole for the valve stem 13.

The float 24 travels along the pull rod 23. When the float moves down and nearly its entire weight rests on the rod eye 23B, which is connected to a hole in extension 8B of 8A, the float 24 will hesitate until enough weight accumulates to overcome the water or back pressure in the water service line 5 that bears against valve 4A. At such time the lever means 8, 8A will snap down past center. In so doing the link 8 will rest on pressure pin 17 in valve stem 13, which moves and holds valve 15 down on its seat and at the same time pin 3 will open the water valve 4.

The tank will now fill with water. At such time, the float will contact thrust washer 23A on 23 to draw the toggle linkage 8, 8A up to center as shown in full lines, the valve 15, being held down by weight of water until the bar 8 is forced against the lift pin 20. As soon as the valve 15 is lifted enough to lose the weight of the water, the spring 21 being pre-loaded with one end seated in the hole in the lever or link 8 and the other end in a hole in the valve stem 13, can now raise the valve 15 and also the pin 17, and hold the pin 17 against the link 8 thereby causing delayed action of valve 15 on downward travel so that valve 15 cannot close until the toggle has again been moved down well below center as shown in lower dotted lines. 4B is a lock for 4C. A stop bar 7 is a stop for upward travel of the toggle linkage.

Special attention is now directed to the use of the vent pipe 9, which communicates between the upper inside area of the tank 25 and water level L in pan 2, the furnace humidifier pan. The pipe 9 is hermetically sealed at the point of entering tank 25; therefore, tank 25 is at all times vacuum sealed until the vent 10 is exposed to free air, as shown, at which time water can discharge through the pipe 12 until water in the pan 2 again reaches a level high enough to cover the vent 10. The vent pipe 9 eliminates the necessity of a mechanically operated air valve and it could also pass through and be sealed into any place into the tank 25 as long as its upper opening is near the top, inside of the tank 25, and the lower vent 10 is slightly above the lower end of the pipe 12.

Various modifications may be made in details without departing from the spirit of my invention as shown and described and I do not limit my claims to the precise forms shown in the drawings.

I claim:

1. A humidifier having a tank for the purpose of accumulating a supply of water, and at intervals feeding the water into a furnace humidifier pan by vacuum means, said tank having automatic means for simultaneously closing a water check valve at the base of the tank, and opening a service water inlet valve when the tank is to be filled; said tank also having automatic means for vice versa operation of said valves after the tank is filled, a furnace humidifier pan rigid with and at least partially underlying the base of the tank, the tank having a water outlet pipe passing through and sealed into the bottom of it, the upper end of the pipe serving as a seat for the water check valve, and the lower end extending down to the normal water level in the humidifier pan, and an air vent pipe passing through and sealed in the base of the tank, its upper end extending to the upper inside area of the tank and its lower end extending downward near to the water level in the humidifier pan, so that when the water level rises and closes the vent pipe it will create a vacuum in the tank, thus stopping the flow of water from the tank.

2. A furnace humidifier comprising: a hermetically sealed tank having a base outlet and service water inlet pipe leading to a service inlet for the tank; a valve adapted to close the inlet and biased to seat in the closed position by water pressure from the inlet pipe; horizontally disposed lever means within the tank adapted to move between upper and lower positions; a water outlet valve having a vertical stem with vertically spaced stops thereon for engaging the lever means whereby as the lever means moves upwardly the valve will open and as the lever means moves downwardly the valve will close, the stops being spaced vertically to provide a range of free movement of the lever means; a spring biasing the water outlet valve upwardly to an open position; a float within the tank; a connection between the lever means and float responsive to raise the lever means upwardly as the water level raises toward and approaches the top of the tank and to lower the lever means as the water drops and approaches the base of the tank; an operative connection between the lever means and the water inlet valve effective to unseat the inlet valve upon downward movement of the lever means and effective to unseat the inlet valve prior to the closing of the water outlet valve; a humidifier pan fixed to the base of the tank and in communication with the outlet, and having a portion thereof extending within the furnace; and a pipe extending through the base of the hermetically sealed tank with a lower end thereof opening within the pan at a level above the outlet and an open end above the normal uppermost level of the water within the tank.

3. A furnace humidifier comprising: a hermetically sealed tank having a base outlet and service water inlet pipe leading to a service inlet for the tank; a valve adapted to close the inlet and biased to seat in the closed position by water pressure from the inlet pipe; a water outlet valve; a float within the tank; a connection between the outlet valve and float responsive to raise the outlet valve from the outlet as the water level raises toward and approaches the top of the tank and to close the outlet valve as the water drops and approaches the base of the tank; an operative connection between the float and the water inlet valve effective to unseat the inlet valve upon the water level dropping to approach the base and effective to unseat the inlet valve prior to the closing of the water outlet valve; a humidifier pan fixed to the base of the tank and in communication with the outlet, and having a portion thereof extending within the furnace; and a pipe extending through the base of the tank with a lower end thereof opening within the pan at a level above the outlet and an upper open end above the normal uppermost level of the water within the tank.

4. A furnace humidifier comprising: a humidifier pan; a hermetically sealed tank above the pan having a base outlet opening within the pan and service inlet; a water check valve for the outlet; a water service valve; mechanical means including a float within the tank adapted in one movement to lift the check valve to unseat it from the outlet and to close the service valve, and in a second movement to reseat the outlet valve and open the service valve; a spring operatively engaging the water check valve and effective to delay reseating of the check valve until after the service valve has opened; and a conduit having a lower end opening into the pan at a level above the outlet and an upper end opening into the tank above the normal uppermost level of the water within the tank.

5. A furnace humidifier comprising: a humidifier pan; a hermetically sealed tank above the pan having a base outlet opening within the pan and a service inlet; a water check valve for the outlet; a water service valve; mechanical means responsive to move in accordance with the rise and fall of the water level adapted in one movement to in sequence close the service valve and lift the check valve to unseat it from the outlet, and in a second movement to in sequence open the service valve and reseat the outlet valve; and a conduit having a lower end opening into the pan at a level above the outlet and an upper end opening into the tank above the normal uppermost level of the water within the tank.

6. The invention defined in claim 5 in which the mechanical means includes and is operated by a float that is responsive to rise and fall in accordance with the water level and the service valve is a check valve that is seated by the water pressure of the service line so that the water pressure resists the falling of the float.

7. The invention defined in claim 5 in which the mechanical means includes a pair of substantially aligned links pivotally interjoined at one end and pivoted at their opposite ends for movement in a vertical plane, and a float connected to vertically adjust the links in accordance with the rise and fall of the water level within the tank, the links being operatively connected respectively to the inlet and outlet valves.

8. The invention defined in claim 7 in which the links are spring loaded to move above and below an aligned position to upper and lower over-center positions and to resist vertical movement of the float.

9. The invention defined in claim 5 in which the mechanical means includes a lever means pivotally supported within the tank for vertical movement to and from a neutral position and is spring loaded to snap to and to resist movement from upper and lower positions, and further characterized by connections between the inlet and outlet valves and lever means whereby the action of opening of the valves occurs as the lever means is snapped from the neutral to the upper and lower positions.

10. The invention defined in claim 9 in which the outlet valve has a vertical stem thereon with upper and lower stops that are engageable with the lever means and are spaced vertically apart sufficient to permit some lost motion of the lever means, and further characterized by a spring connected to the outlet valve for biasing the valve upwardly.

References Cited by the Examiner
UNITED STATES PATENTS

| | | | |
|---|---|---|---|
| 362,536 | 5/1887 | Requa | 158—40 |
| 362,918 | 5/1887 | Requa | 158—40 |
| 1,380,321 | 5/1921 | Liebold | 126—113 |
| 1,783,891 | 12/1930 | Thibert | 158—40 X |
| 1,817,357 | 8/1931 | Fisher | 126—113 X |

JAMES W. WESTHAVER, *Primary Examiner.*